United States Patent [19]

Brunelle

[11] 4,321,356

[45] Mar. 23, 1982

[54] TRANSESTERIFICATION PROCESS UTILIZING AS A REACTANT BIS(ORTHO-HALOARYL)CARBONATES

[75] Inventor: Daniel J. Brunelle, Schenectady, N.Y.

[73] Assignee: General Electric Company, Schenectady, N.Y.

[21] Appl. No.: 134,349

[22] Filed: Mar. 27, 1980

[51] Int. Cl.$^3$ .............................................. C08G 63/62
[52] U.S. Cl. .................................... 528/200; 528/202
[58] Field of Search ............................... 528/200, 202

[56] References Cited

U.S. PATENT DOCUMENTS 4,224,434  9/1980  Quinn et al. ....................... 528/200

FOREIGN PATENT DOCUMENTS 1079822  8/1966  United Kingdom .

*Primary Examiner*—Maurice J. Welsh
*Attorney, Agent, or Firm*—Peter A. Bielinski; James C. Davis, Jr.; Joseph T. Cohen

[57] ABSTRACT

A polycarbonate transesterification process comprising reacting a bis(ortho-haloaryl)carbonate and a dihydric phenol under transesterification reaction conditions.

10 Claims, No Drawings

TRANSESTERIFICATION PROCESS UTILIZING AS A REACTANT BIS(ORTHO-HALOARYL)CARBONATES

CROSS REFERENCE TO RELATED APPLICATIONS

This invention is related to U.S. patent applications Ser. No. 106,855 filed Dec. 26, 1979; which is now abandoned and of which Ser. No. 013,481 is a continuation-in-part application which was filed on May 11, 1981; 106,856 filed Dec. 26, 1979 which is now abandoned of which Ser. No. 013,482 is a continuation-in-part application filed on Apr. 27, 1981; which is Ser. No. 143,804 filed Apr. 23, 1980 all of Daniel Joseph Brunelle, and Ser. No. 970,058 filed Dec. 15, 1978 which is now U.S. Pat. No. 4,217,438 of Daniel Joseph Brunelle and William Edward Smith. The above applications are assigned to the assignee of this invention and all of their disclosures are incorporated herein in their entirety by reference.

BACKGROUND OF THE INVENTION

1. Field of the Invention

This invention relates to a polycarbonate transesterification process comprising reacting a bis(ortho-haloaryl) carbonate and a dihydric phenol under transesterification reaction conditions.

2. Description of the Prior Art

In general, polycarbonate transesterification prior art including The Enchclopedia of Polymer Science, Vol. 10 (1969), Chemistry and Physics of Polycarbonates, Polymer Reviews, H. Schnell, Vol. 9, John Wiley and Sons, Inc. (1964); "Polycarbonates", Christopher and Fox, Reinhold Corporation of New York (1962); among other publications, including numerous U.S. and foreign patents including Great Britain Pat. No. 1,079,822 issued to Bayer (1966), authored by Curtius, Ludwig, bottenbruch and Schnell, report that generally effective transesterification reactions involving aromatic dihydroxy compounds with carbonic acid aromatic diesters can be carried out in the presence of basic catalysts in the formation of high molecular weight impact-resistant thermoplastic polycarbonates.

DESCRIPTION OF THE INVENTION

This invention embodies a polycarbonate transesterification process comprising reacting a bis(ortho-haloaryl)carbonate and a dihydric phenol under transesterification reaction conditions.

The "bis(ortho-haloaryl)carbonate" also commonly referred to as a carbonic acid aromatic diester of an orthohalophenol is defined herein by the general formula:

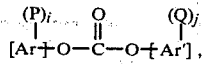

where at least a P or Q substituent is an ortho-positioned halogen, e.g. Cl, F, Br or I, or a trifluoromethyl group, e.g. —$CF_3$, directly bonded to a ring carbon atom located adjacent to an Oxy group of the carbonate, i and j represent whole numbers of at least 1 up to a maximum equivalent to the number of replaceable hydrogen atoms or alkyl groups, e.g. $C_{1-4}$ alkyl, substituted for on the aromatic rings comprising Ar and Ar'.

Sterically hindered bis(ortho-haloaryl)carbonates having P and Q substituents positioned on all available ortho positions of the same aromatic ring are excluded as reactants in this patent.

Presently preferred bis(ortho-haloaryl)carbonates are of the formula:

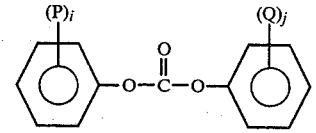

where independently at least a P or Q is an ortho-positioned halogen or a trifluoromethyl group, i and j are as defined above. Specific examples follow:
bis(o-chlorophenyl)carbonate
bis(o-trifluoromethylphenyl)carbonate
bis(2-chloro-4-methylphenyl)carbonate
o-iodophenyl o-trifluoromethylphenyl carbonate
bis(o-fluorophenyl)carbonate
bis(2-chloro-3-methylphenyl) carbonate,
bis(2-bromo-4-ethylphenyl) carbonate,
bis(2-chloro-5-propylphenyl) carbonate, and
bis(2-iodo-6-butylphenyl) carbonate, etc.

Any of the dihydric phenols, bases, as well as reaction parameters relative to amounts of reactants, etc., as well as reaction time, temperature and pressure described in Ser. No. 970,058 of D. J. Brunelle and W. E. Smith can be employed in the process of this invention. Accordingly, for brevity their descriptions are incorporated herein in their entirety by reference.

Illustratively, dihydric phenols, include dihydric or dihydroxy aromatic compounds—also incorporated herein by reference—defined by Fox's Formula II in U.S. Pat. No. 3,153,008, column 2, lines 23–72 and column 3, lines 1–42. Presently preferred dihydric phenols are of the formulas:

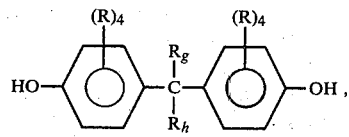

where independently each R is hydrogen, $C_{1-4}$ alkyl, methoxy, bromine and chlorine, $R_g$ and $R_h$ are hydrogen or a $C_{1-30}$ monovalent hydrocarbon or hydrocarbonoxy group, and

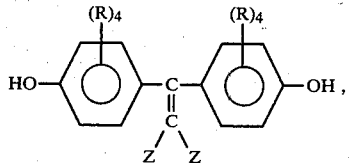

where independently each R is as defined above and each Z is hydrogen, chlorine or bromine, subject to the proviso that at least one Z is chlorine or bromine.

Specific examples follow:
4,4'-dihydroxy-diphenyl-1,1-butane,
4,4'-dihydroxy-diphenyl-2-chlorophenyl methane,
4,4'-dihydroxy-diphenyl-2,2-propane also known as "BPA" or bis(4-hydroxyphenyl)propane-2,2,
4,4'-dihydroxy-3-methoxy-diphenyl-2,2-propane, 4,4'-dihydroxy-3-isopropyl-diphenyl-2,2-propane,
4,4'-dihydroxy-diphenyl-2,2-nonane,
4,4'-dihydroxy-2,2',3,3',5,5',6,6'-octamethyl-diphenyl methane,
4,4'-dihydroxy-2,2'-dimethyl-5,5'-di-tert.-butyl-diphenyl methane,
4,4'-dihydroxy-3,3',5,5'-tetrachloro-diphenyl-2,2-propane,
4,4'-dihydroxy-3,3',5,5'-tetrabromo-diphenyl-2,2-propane,
1,1-dichloro-2,2-bis(4-hydroxyphenyl)ethylene,
1,1-dibromo-2,2-bis(4-hydroxyphenyl)ethylene,
1,1-dichloro-2,2-bis(5-methyl-4-hydroxyphenyl)ethylene,
1,1-dibromo-2,2-bis(3,6-n-butyl-4-hydroxyphenyl)ethylene,
1,1-dichloro-2,2-bis(2-chloro-5-ethyl-4-hydroxyphenyl)ethylene,
1-bromo-2,2-bis(4-hydroxyphenyl)ethylene,
1,1-dichloro-2,2-bis(2-ethoxy-4-hydroxyphenyl)ethylene, and
1-bromo-2,2-bis(3,5-diphenylether-4-hydroxyphenyl)ethylene.

Illustrative specific examples of inorganic or organic bases that can be employed follow: sodium metal, lithium hydroxide, sodium carbonate, sodium acetate, sodium methylate, sodium tetrasulfide, sodium borohydride, isopropylamine, propanediamine, pyridine, 1,2,2,6,6-pentamethylpiperidine, sodium benzoate, sodium phenoxide, sodium salts of bisphenol-A, etc.

Presently preferred bases are certain, metal hydride, catalysts—described in greater detail in U.S. Ser. Nos. 106,856 and 106,855 previously referred to—and include any compound which contains aluminumhydride or boronhydride counterions, for example alkali metal, alkaline earth metal, quaternary ammonium, quaternary phosphonium, or tertiary sulfonium aluminumhydrides or boronhydrides.

An especially preferred metal hydride is the product obtained by forming a homogeneous solution or melt of a metal hydride containing aluminumhydride or boronhydride counterions with a bis(ortho-haloaryl)carbonate or dihydric phenol, subsequently separating any solvent—if used, cooling, and recovering a homogeneous solid pre-formed mixture of metal hydride and bis(ortho-haloaryl)carbonate and/or phenol, more preferably a bis(ortho-haloaryl)carbonate.

Any amount of base can be employed. In general, effective mole ratios of base, e.g. LiOH, LiAlH$_4$, Me$_4$NBH$_4$, etc., to dihydric phenols are within the range of from about $1 \times 10^{-8}$ to 1 or even lower to about 1 to 1, or even higher, preferably from $1 \times 10^{-6}$ to 1 to about $1 \times 10^{-2}$ to 1, and more preferably from $1 \times 10^{-5}$ to 1 to $1 \times 10^{-3}$ to 1. Generally, mole ratios of at least $1 \times 10^{-5}$ to 1 enhances both the reaction rate and the yield of polycarbonate.

Any reaction pressure can be employed, e.g. atmosphere, subatmosphere or superatmospheric. Generally, however, the process is preferably carried out under a reaction pressure of approximately 1 atm. (~760 mm. Hg.) during the initial phase of the reaction with a subsequent pressure reduction to values in the order of 0.1 to 1.0 Hg. (vacuum), or even lower.

Any reaction temperature can be employed. Optimum reaction temperatures are generally within the range of from 80° C. or even lower, to 300° C. or even higher, and more often 120° C. to 260° C.

Any reaction time can be employed. Generally, optimum reaction time periods are from about 0.5 hours or even less to about 24 hours or even more.

BEST MODE

EXAMPLES I AND II (A) First Stage Transesterification 22.83 g. of bis(4-hydroxyphenyl)propane-2,2 (100.0 mmol.) and 28.44 g. of bis(o-chlorophenyl)carbonate (100.5 mmol.) blanketed under a nitrogen (N$_2$) atmosphere was preheated for 15 minutes to a temperature of about 150° C. The resulting melt mixture was then charged with $1 \times 10^{-3}$ mole percent LiOH catalyst (based on BPA) added in a H$_2$O solution. After catalyst addition, the melt temperature was raised sequentially accordingly: 150° C. to 220° C. over ½ hour, 220° C. to 240° C. over the next 20 minutes, and then 240° C. to 260° C. during the next 20 minutes. Finally, the melt temperature was held at about the 260°-265° C. range for another 20 minutes—while continuously maintaining the reaction mixture under N$_2$ atmosphere while remving by-product o-chlorophenol via distillation. A control-contrast reaction was carried out under similar reaction conditions substituting diphenylcarbonate for bis(o-chlorophenyl)carbonate.

(B) Second Stage Transesterification

The resulting first stage reaction BPA polycarbonate product was subsequently heated to 285° C. over a ½ hour period.

A summary of the first and second stage process temperature sequences and properties of the resulting polycarbonates is set out in Tables I and II, respectively.

TABLE I

Summary of first and Second Stage Reaction Parameters

| Process Sequence | Cumulative Reaction Time/hr. | Time Individual Interval/hr. | Temp.°C. | Pressure Hg. |
|---|---|---|---|---|
| First Stage | 0.50 | 0.50 | 150-220 | N$_2$ atm./760 mm |
| | 0.83 | 0.33 | 220-240 | N$_2$ atm./760 mm |
| | 1.16 | 0.33 | 240-260 | N$_2$ atm./760 mm |
| | 1.49 | 0.33 | 260-165 | N$_2$ atm./760 mm |
| Summary | 1.49 | N.A.[1] | 150-265 | N$_2$ atm./760 mm |
| Second Stage | 0.50 | 0.50 | 285 | N$_2$ atm./ 1 mm |
| Summary | 1.99 | N.A. | 150-285 | N$_2$ atm./760-1 mm |

[1] = not applicable

TABLE II

| Example No. | Stage | Primary Carbonate Starting Material | BPA-Polycarbonate | | |
|---|---|---|---|---|---|
| | | | Color[2] | MW$_w$[3] | I.V.[4] |
| I | First | bis(o-chlorophenyl)carbonate | faint pink | 9,900 | — |
| II | First | diphenylcarbonate | light tan | 2,500 | — |
| I | Second | BPA-polycarbonate-MW$_w$ 9900 | faint yellow | 45,500 | 0.57 |
| II | Second | BPA-polycarbonate-MW$_w$ 2500 | dark yellow | 16,300 | 0.26 |

FOOTNOTES:
[2] = the color of the product recorded at the end of the reaction while still retained in the first or second stage reactor
[3] = GPC wt. avg. MW, rel. to polystyrene
[4] = IV measured in CHCL$_3$ at 25° C.

EXAMPLES III AND IV

(A) First Stage Transesterification 22.83 g. of bis(4-hydroxyphenyl)propane-2,2 (100.0 mmol.) and 28.44 g. of bis(o-chlorophenyl)carbonate (100.5 mmol.) blanketed under a nitrogen ($N_2$) atmosphere was preheated for 15 minutes to a temperature of about 155° C. The resulting melt mixture was then charged with $1 \times 10^{-3}$ mole percent LiOH catalyst (based on BPA) added in a $H_2O$ solution. After catalyst addition, the melt temperature was gradually raised to 210° C. over a 2 hour period. Maintaining a temperature of 210° C. a vacuum of 100 mm. Hg was applied during the next 45 minutes, and 10 mm. Hg during the final 60 minutes of the reaction. A control-contrast reaction was carried out under similar reaction conditions substituting diphenylcarbonate for bis(o-chlorophenyl)carbonate.

(B) Second Stage Transesterification

The resulting first stage reaction BPA polycarbonate product was subsequently heated to 285° C. over a ½ hour period.

A summary of the first and second stage process temperature sequences and properties of the resulting polycarbonates is set out in Tables III and IV, respectively.

TABLE III

Summary of First and Second Stage Reaction Parameters

| Process Sequence | Cumulative Reaction Time/hr. | Time Individual Interval/hr. | Temp.°C. | Pressure Hg. |
|---|---|---|---|---|
| First Stage | 2.0 | 2.0 | 155–210 | air atm./760 mm |
| | 2.75 | 0.75 | 210 | air atm./100 mm |
| | 3.75 | 1.00 | 210 | air atm./ 10 mm |
| Summary | 3.75 | N.A.[1] | 155–210 | air atm./760-10mm |
| Second Stage | 0.50 | 0.50 | 285 | air amt./ 1 mm |
| Summary | 4.25 | N.A. | 155–285 | air atm./760-1 mm |

[1]- same as previous Examples.

TABLE IV

| Example No. | Stage | Primary Carbonate Starting Material | BPA-Polycarbonate color[2] | $MW_w$[3] | I.V.[4] |
|---|---|---|---|---|---|
| | First | bis(o-chlorophenyl)carbonate | colorless | 4,150 | — |
| II | First | diphenylcarbonate | light gold-yellow | 1,100 | — |
| I | Second | BPA-polycarbonate-$MW_w$ 4,150 | colorless | 56,700 | 0.64 |
| II | Second | BPA-polycarbonate-$MW_w$ 1,100 | yellow | 13,500 | 0.21 |

FOOTNOTES:
[2],[3] & [4]- same as previous Examples.

EXAMPLES V–VIII

A series of transesterification reactions were carried out according to the following process parameters.

(A) First Stage Transesterification 11.4 g. of bis(4-hydroxyphenyl)propane-2,2 (50.0 mmol.) and 14.3 g. of bis(o-chlorophenyl)carbonate (50.5 mmol.) and 1.0 mg. of tetramethylammonium borontetrahydride ($Me_4NBH_4$) (0.011 mmol.) blanketed under a nitrogen ($N_2$) atmosphere was heated for 60 minutes to a temperature of about 250° C. o-chlorophenol began to distill at about 210° C. After about one hour at 250° C., the pressure was varied accordingly: 100 mm Hg over the next 60 minutes, then 40 mm Hg for the next 30 minutes. Finally, the melt temperature was reduced to about 210° C. and the pressure decreased to about 1 mm Hg during the next 30 minutes.

(B) Second Stage Transesterification

The resulting first stage reaction BPA polycarbonate products were subsequently heated to temperatures of 285°–310° C. over a ½ or 1 hour period.

A summary of the first and second stage process temperature sequences and properties of the resulting polycarbonates is set out in Tables V and VI, respectively.

TABLE V

Summary of First and Second Stage Reaction Parameters

| Examples | Process Sequence | Cumulative Reaction Time/hr. | Time Individual Interval/hr. | Temp. °C. | Pressure Hg. |
|---|---|---|---|---|---|
| V–VIII | First Stage | 1.0 | 1.0 | 25–250 | $N_2$ atm./760 mm |
| | | 2.0 | 1.0 | 250 | $N_2$ atm./100 mm |
| | | 2.50 | 0.50 | 250 | $N_2$ atm./ 40 mm |
| | | 3.0 | 0.50 | 210 | $N_2$ atm./1 mm |
| " | Summary | 3.0 | N.A.[1] | 250–210 | $N_2$ atm./760-1 mm |
| V | Second Stage | 0.50 | 0.50 | 310 | $N_2$ atm./760-1 mm |
| " | Summary | 3.50 | N.A. | 310 | $N_2$ atm./0.1 mm |
| VI | Second Stage | 1.0 | 1.0 | 300 | $N_2$ atm./0.1 mm |
| " | Summary | 4.0 | N.A. | 300 | $N_2$ atm./760-0.1 mm |
| VII | Second Stage | 0.50 | 0.50 | 290 | $N_2$ atm./0.1 mm |
| " | Summary | 3.5 | N.A. | 290 | $N_2$ atm./760-0.1 mm |
| VIII | Second Stage | 0.50 | 0.50 | 285 | $N_2$ atm./0.1 mm |
| " | Summary | 3.5 | N.A. | 285 | $N_2$ atm./760-0.1 mm |

[1] = same as previous Examples.

TABLE VI

| Example No. | Stage | Primary Carbonate Starting Material | BPA-Polycarbonate Color[2] | $MW_w{}^3$ | I.V.[4] |
|---|---|---|---|---|---|
| V | First | bis(o-chlorophenyl)-carbonate | colorless | 15,200 | — |
| " | Second | BPA-polycarbonate-$MW_w$ 15,200 | " | 84,500 | 0.90 |
| VI | Second | BPA-polycarbonate-$MW_w$ 15,200 | pale yellow | 82,340 | 0.87 |
| VII | Second | BPS-polycarbonate-$MW_w$ 15200 | colorless | 55,800 | 0.62 |
| VIII | Second | BPA-polycarbonate- | " | 44,100 | 0.50 |

FOOTNOTES:
[2], [3] & [4] = same as previous Examples.

EXAMPLE IX 11.4 g. of bis(4-hydroxyphenyl)propane-2,2 (50.0 mmol.) and 14.2 g. of bis(o-chlorophenyl)carbonate (50.25 mmol.) blanketed under a nitrogen ($N_2$) atmosphere was preheated to a temperature of about 100° C. The resulting melt mixture was then charged with $0.1 \times 10^{-3}$ mole percent LiOH catalyst (based on BPA) added in a 0.10 N LiOH/$H_2O$ solution. After catalyst addition, the melt temperature was raised sequentially accordingly: 100° C. to 230° C. over ½ hour, 230° C. to 260° C. over the next 15 minutes, and then maintained at 260° C. during the next 30 minutes.

A summary of the process temperature-pressure sequence and properties of the resulting polycarbonate is set out in Tables VII and VIII, respectively.

TABLE VII

Summary of First and Second Stage Reaction Parameters

| Cumulative Reaction Time/hr. | Time Individual Interval/hr. | Temp. °C. | Pressure Hg. |
|---|---|---|---|
| 0.50 | 0.50 | 100–230 | $N_2$ atm./760 mm |
| 0.75 | 0.25 | 230–260 | $N_2$ atm./760 mm |
| 1.00 | 0.25 | 260 | $N_2$ atm./ 40 mm |
| 1.25 | 0.25 | 260 | $N_2$ atm./ 1 mm |
| 1.25 | N.A.[1] | 100–260 | $N_2$ atm./760-1 mm |

[1] = same as previous Examples.

TABLE VIII

| Example No. | Carbonate Starting Material | BPA-Polycarbonate Color[2] | $MW_w{}^3$ | I.V.[4] |
|---|---|---|---|---|
| IX | bis(o-chlorophenyl)carbonate | colorless | 50,400 | 0.54 |

FOOTNOTES:
[2], [3] & [4] = same as previous Examples.

In general, the use of bis(ortho-haloaryl)carbonates in the polycarbonate transesterification process of this patent provides advantages not associated with other carbonate transesterification substrates, such as diphenylcarbonate. The use of bis(ortho-haloaryl)carbonate substrates provides—when contrasted with diphenylcarbonate—the following advantages: (1) improved transesterification reaction rate, (2) less polycarbonate color formation during the transesterification reaction, (3) milder transesterification reaction conditions including lower temperatures (4) reduced amounts of carbonate substrate since only stoichiometric amounts or amounts slightly in excess, e.g. 0.5 to 1%, are required for complete conversion of all dihydric phenol to polycarbonate, and (5) reduced quantities of catalyst at improved reaction rate, temperature and pressure transesterification reaction conditions. Illustratively the transesterified polycarbonate end product derived from the process of this patent, preferably exhibit intrinsic viscosities of at least 0.3 and more preferably about 0.5 deciliters per gram (dl./g.) as measured in either methylene chloride or chloroform or similar solvent systems at 25° C. The upper intrinsic viscosity number is not critical, however, it will generally be about 1.5 dl./g. Especially useful polycarbonates generally have an intrinsic viscosity within the range of from about 0.38 to about 0.7 dl./g. Preferably, the polycarbonates have a number average molecular weight of at least about 5,000, and more preferably from about 10,000 to about 50,000. Polycarbonates of such molecular weight characteristics process easily inbetween about 450° F. and 650° F., and are generally suitable raw materials for the manufacture of filaments, fibers, films, sheets, laminates, and other thermoplastic articles of manufacture including reinforced articles employing conventional molding, extruding, etc., manufacturing techniques.

I claim:

1. A polycarbonate transesterification process comprising reacting a bis(ortho-haloaryl)carbonate and a dihydric phenol under transesterification reaction conditions in the presence of a metal hydride catalyst.

2. The claim 1 process where the carbonate is of the formula:

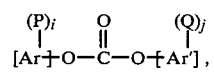

where at least a P or Q substituent is an ortho-positioned halogen or a trifluoromethyl group directly bonded to a ring carbon atom located adjacent to an oxy group of the carbonate, i and j represent whole numbers of at least 1 up to a maximum equivalent to the number of replaceable hydrogen atoms or alkyl groups substituted for on the aromatic rings comprising Ar and Ar'.

3. The claim 1 process where the dihydric phenol is of the formula:

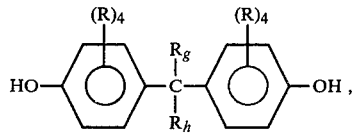

where independently each R is hydrogen, $C_{1-4}$ alkyl, methoxy, bromine or chlorine, $R_g$ and $R_h$ are hydrogen or a $C_{1-30}$ monovalent hydrocarbon or hydrocarbonoxy group or of the formula:

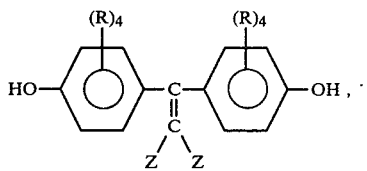

where independently each R is as defined previously and each Z is hydrogen, chlorine or bromine, subject to the proviso that at least one Z is chlorine or bromine.

4. The claim 2 process where the transesterification reaction conditions employ a metal hydride catalyst selected from the class consisting of aluminumhydride and boronhydride.

5. The claim 4 process where the metal hydride is a pre-formed mixture of a metal hydride and a compound selected from the class consisting of a bis(orthohaloaryl)-carbonate and a dihydric phenol.

6. The claim 1 process where the transesterification reaction conditions are at temperatures less than about 300° C.

7. The claim 6 process where the transesterification reaction conditions include an inert atmosphere.

8. The claim 2 process where carbonate is bis-(ortho-chloro-phenyl) carbonate.

9. The claim 3 process where the dihydric phenol is bis(4-hydroxyphenyl)propane-2,2.

10. A polycarbonate transesterification process comprising reacting bis(ortho-chlorophenyl)carbonate and bis(4-hydroxyphenyl)propane-2,2 under transesterification conditions in the presence of a metal hydride catalyst.

* * * * *